US011653076B2

(12) United States Patent
Reid et al.

(10) Patent No.: US 11,653,076 B2
(45) Date of Patent: May 16, 2023

(54) INTERNET PROTOCOL (IP)-SPEAKER WITH IP-CAMERA

(71) Applicant: Hubbell Incorporated, Shelton, CT (US)

(72) Inventors: Jeffrey T. Reid, Sinking Spring, PA (US); Roger Deihm, Mohnton, PA (US); John J. Penny, Mohnton, PA (US)

(73) Assignee: Hubbell Incorporated, Shelton, CT (US)

( * ) Notice: Subject to any disclaimer, the term of this patent is extended or adjusted under 35 U.S.C. 154(b) by 27 days.

(21) Appl. No.: 17/333,277

(22) Filed: May 28, 2021

(65) Prior Publication Data

US 2021/0385359 A1 Dec. 9, 2021

Related U.S. Application Data

(60) Provisional application No. 63/033,871, filed on Jun. 3, 2020.

(51) Int. Cl.
*H04R 29/00* (2006.01)
*H04N 5/225* (2006.01)
(Continued)

(52) U.S. Cl.
CPC ......... *H04N 5/2252* (2013.01); *G03B 17/561* (2013.01); *G08B 25/10* (2013.01);
(Continued)

(58) Field of Classification Search
CPC ............... H04N 5/2252; H04N 5/2254; H04N 5/23206; H04N 7/183; G03B 17/561; G08B 25/10; H04R 2499/10
(Continued)

(56) References Cited

U.S. PATENT DOCUMENTS 9,992,389 B1 6/2018 Fu et al.
10,051,129 B2 8/2018 Newman et al.
(Continued)

FOREIGN PATENT DOCUMENTS

EP 1 881 687 A1 1/2008

OTHER PUBLICATIONS

International Search Report and Written Opinion dated Sep. 10, 2021, which issued in the corresponding PCT Patent Application No. PCT/US2021/034796.

(Continued)

*Primary Examiner* — Ammar T Hamid
(74) *Attorney, Agent, or Firm* — Dickinson Wright PLLC

(57) ABSTRACT

An internet protocol (IP)-based ceiling or wall-mounted speaker with optional IP-based camera and/or alarm indicator is provided. The IP-based speaker has a detachable add-on device for accommodating different types of interchangeable camera configurations and other components such as flush mount camera, camera providing angled view, night vision-type camera for different services and configurations. Multiple IP-based speakers are connected to an IP device to exchange audio data via an Ethernet connection for cost effective, flexible and convenient installations. The IP-based speaker has a speaker cone for talkback features, and relay for remote relay control of doors or gates for security applications as well as public address applications.

26 Claims, 11 Drawing Sheets

(51) Int. Cl.
*H04N 7/18* (2006.01)
*H04N 5/232* (2006.01)
*G03B 17/56* (2021.01)
*G08B 25/10* (2006.01)
*H04R 9/06* (2006.01)

(52) U.S. Cl.
CPC ....... *H04N 5/2254* (2013.01); *H04N 5/23206* (2013.01); *H04N 7/183* (2013.01); *H04R 2499/10* (2013.01)

(58) Field of Classification Search
USPC .................................................. 381/59, 334
See application file for complete search history.

(56) References Cited

U.S. PATENT DOCUMENTS

| | | |
|---|---|---|
| 2006/0287746 A1 | 12/2006 | Braithwaite et al. |
| 2013/0273869 A1 | 10/2013 | Parker et al. |
| 2018/0219976 A1 | 8/2018 | Decenzo et al. |
| 2020/0020213 A1* | 1/2020 | Carr et al. |
| 2020/0120309 A1* | 4/2020 | Siminoff ........... H04M 1/72418 |
| 2020/0280590 A1 | 9/2020 | Rumsby |
| 2020/0342238 A1 | 10/2020 | Bailey et al. |
| 2020/0375007 A1 | 11/2020 | Bailey |
| 2021/0075899 A1* | 3/2021 | Reid ..................... G06F 3/0412 |

OTHER PUBLICATIONS

Mesnik, "How IP Powered Speakers Work", Kintronics, May 5, 2017 (May 5, 2017) Retrieved on Aug. 1, 2021 (Aug. 1, 2021) from <https://kintronics.com/ip-powered-speakers-work/> entire document.

* cited by examiner

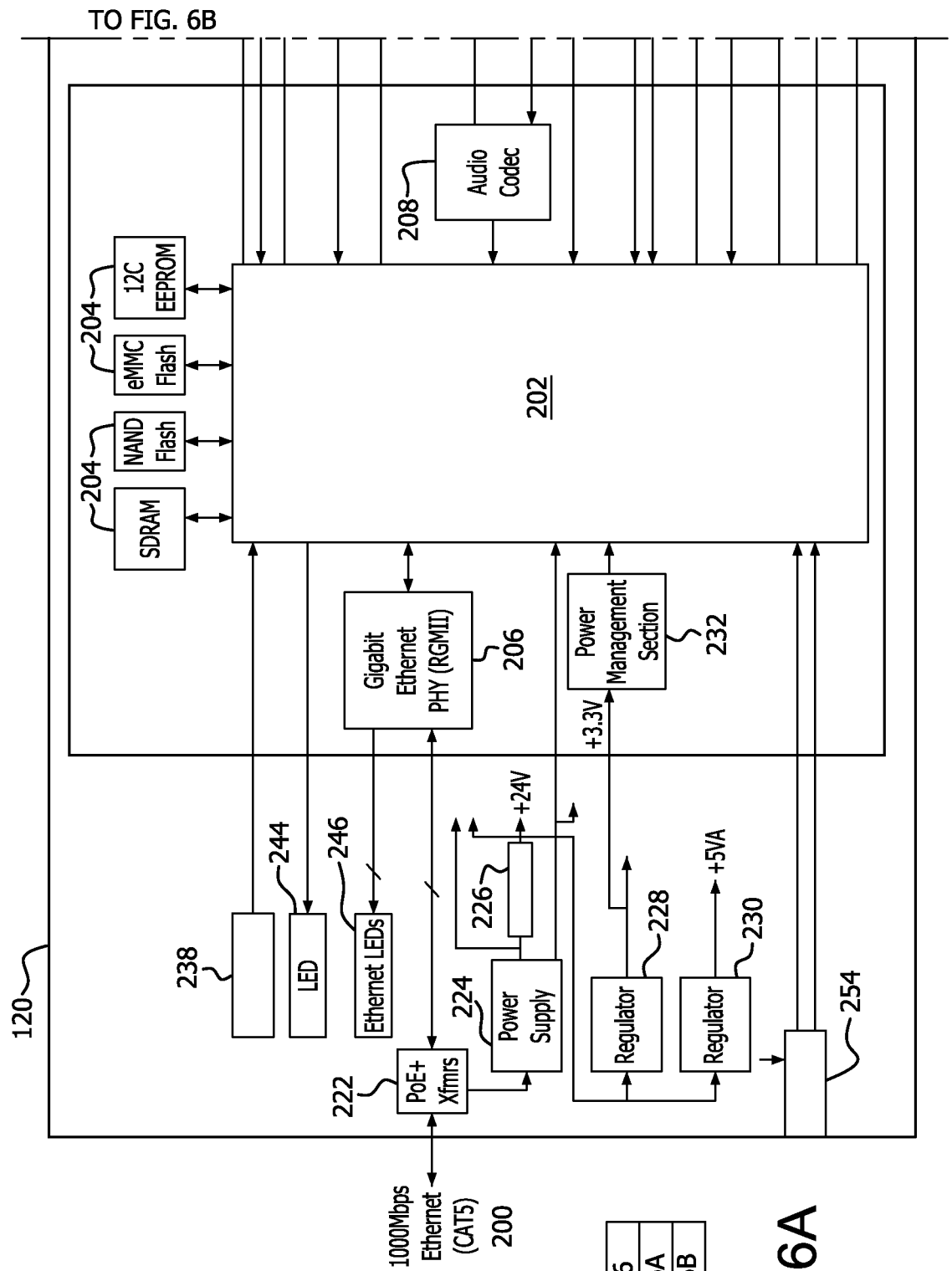

INTERNET PROTOCOL (IP)-SPEAKER WITH IP-CAMERA

This application claims the benefit under 35 U.S.C. § 119(e) of U.S. provisional patent application Ser. No. 63/033,871, filed Jun. 3, 2020; the contents of which are incorporated herein by reference in their entirety.

BACKGROUND

Field

Illustrative embodiments relate generally to an internet protocol (IP)-based ceiling or wall-mounted speaker with optional IP-based camera and/or alarm indicator. Illustrative embodiments also relate generally to an internet protocol (IP)-based speaker having a detachable add-on device for accommodating different types of camera configurations and other components.

Description of Related Art

Commercial speakers are used in commercial settings, industrial settings, or other relatively large places with need for output of announcements, pages, alarms, and the like, to people in these settings. Speakers are generally distributed throughout a facility or other areas, and particularly when the facility has several different levels or floors, to ensure people are within the output range of a speaker(s). Speaker installations therefore can be costly due to the cost per speaker and the number of speakers needed to provide adequate announcement/alarm coverage.

SUMMARY

An IP-based ceiling or wall-mounted speaker is provided in accordance with different illustrative embodiments.

It is an aspect of illustrative embodiments to provide a speaker comprising: a loudspeaker connected to a speaker amplifier; a codec configured to provide audio to the speaker amplifier; an Ethernet interface to an Ethernet link; a camera; and a processing device connected to the Ethernet interface and the codec and the camera, and configured to associate the speaker with an Internet Protocol (IP) address. The processing device is further configured to receive packets with the IP address from an IP device connected to the speaker via the Ethernet link and to transmit packets to the IP device via the Ethernet link, and output digitized audio in received packets via the loudspeaker, and to provide images from the camera to the IP device via transmitted packets.

In accordance with aspects of illustrative embodiments, the IP device is chosen from a session initiation protocol (SIP) server, an IP endpoint device, and a video surveillance device, and an IP endpoint device is chosen from a Voice over IP (VoIP) phone and a Public Address and General Alarm System (PA/GA) controller.

In accordance with aspects of illustrative embodiments, the speaker further comprises: a main housing having walls that enclose the loudspeaker, the codec, the Ethernet interface and the processing device except for a front side thereof; and a detachable cover that covers the front side of the main housing when detachably affixed thereto.

In accordance with aspects of illustrative embodiments, the main housing has a recess therein to receive an add-on device, and the cover has an opening through which the add-on device is inserted, the add-on device being detachably affixed to at least one of the main housing and the cover.

In accordance with aspects of illustrative embodiments, the camera is provided in the add-on device and is electrically connected to the processing device when the add-on device is affixed to at least one of the main housing and the cover.

In accordance with aspects of illustrative embodiments, the camera comprises a lens that is flush mounted with respect to the cover and provides a field of view parallel with respect to a longitudinal axis of the speaker.

In accordance with aspects of illustrative embodiments, the add-on device comprises a housing structure that extends away from the cover when the add-on device is affixed to the speaker, and a lens of the camera is provided in the housing structure and directed to provide an angled field of view with respect to a longitudinal axis of the speaker.

In accordance with aspects of illustrative embodiments, the cover has a grill comprising a pattern of apertures, and the add-on device comprises a second cover configured to cover the opening.

In accordance with aspects of illustrative embodiments, the second cover has a second grill comprising the pattern of apertures.

In accordance with aspects of illustrative embodiments, the speaker comprises at least one transformer and a power supply configured to supply power the speaker from the Ethernet link using at least one of using Power over the Ethernet (PoE) and PoE+.

In accordance with aspects of illustrative embodiments, the speaker further comprises at least one indicator that is visible to a user when the speaker is mounted to a surface, and is chosen from a light emitting diode (LED) and a bicolor LED.

In accordance with aspects of illustrative embodiments, the processing device is configured to control the at least one indicator to indicate a connection status chosen from when the speaker is connected to the Ethernet link, and when speaker is not connected to the Ethernet link.

In accordance with aspects of illustrative embodiments, the loudspeaker comprises a speaker cone configured to receive audio when not outputting audio, and the speaker is configured to operate in talkback mode wherein audio can be inputted via the speaker cone and the processing device is configured to control digitization and transmission of the inputted audio to the IP device.

In accordance with aspects of illustrative embodiments, the speaker comprises a talkback switch input to the processing device, the processing device being configured to initiate the talkback mode in response to receiving the talkback switch input upon activation of a talkback switch.

In accordance with aspects of illustrative embodiments, the speaker further comprises a relay configured to operate a device connected to the relay in response to a relay control output generated by the processing device.

In accordance with aspects of illustrative embodiments, the speaker further comprises a memory device configured to store audio files, the processing device configured to output at least one of the stored audio files via the loudspeaker in response to instructions received from the IP device identifying the at least one of the stored audio files for playback.

In accordance with aspects of illustrative embodiments, the camera is night vision-type camera, and further comprising an infrared light emitting diode (LED) to provide illumination for the night vision-type camera.

In accordance with aspects of illustrative embodiments, the camera comprises an infrared (IR) camera and an automatically switchable IR filter to block IR and pass visible light when camera image quality is determined to meet criteria for day-time image capture operation, and to not block IR when camera image quality is determined to meet criteria for night-time image capture operation.

It is an aspect of illustrative embodiments to provide a speaker comprising: a loudspeaker connected to a speaker amplifier; a codec configured to provide audio to the speaker amplifier; an Ethernet interface to an Ethernet link; at least one indicator visible to a user when the speaker is mounted to a surface; and a processing device connected to the Ethernet interface and the codec and the indicator, and configured to associate the speaker with an Internet Protocol (IP) address. The processing device is further configured to receive packets with the IP address from an IP device connected to the speaker via the Ethernet link, and output digitized audio in the received packets via the loudspeaker, and operate the at least one indicator to indicate a selected condition in accordance with indicator instructions in the received packets.

In accordance with aspects of illustrative embodiments, the IP device is chosen from a session initiation protocol (SIP) server, an IP endpoint device, and a video surveillance device, and an IP endpoint device is chosen from a Voice over IP (VoIP) phone and a Public Address and General Alarm System (PA/GA) controller.

In accordance with aspects of illustrative embodiments, the speaker comprises at least one transformer and a power supply configured to supply power the speaker from the Ethernet link using at least one of using Power over the Ethernet (PoE) and PoE+.

In accordance with aspects of illustrative embodiments, the at least one indicator is chosen from a light emitting diode (LED) and a bicolor LED.

In accordance with aspects of illustrative embodiments, the processing device is configured to control the at least one indicator to indicate a connection status chosen from when the speaker is connected to the Ethernet link, and when speaker is not connected to the Ethernet link.

In accordance with aspects of illustrative embodiments, the loudspeaker comprises a speaker cone configured to receive audio when not outputting audio, and the speaker is configured to operate in talkback mode wherein audio can be inputted via the speaker cone and the processing device is configured to control digitization and transmission of the inputted audio to the IP device.

Additional and/or other aspects and advantages of illustrative embodiments will be set forth in the description that follows, or will be apparent from the description, or may be learned by practice of the illustrative embodiments. The illustrative embodiments may comprise apparatuses and methods for operating same having one or more of the above aspects, and/or one or more of the features and combinations thereof. The illustrative embodiments may comprise one or more of the features and/or combinations of the above aspects as recited, for example, in the attached claims

BRIEF DESCRIPTION OF THE DRAWINGS

The above and/or other aspects and advantages of embodiments of the illustrative embodiments will be more readily appreciated from the following detailed description, taken in conjunction with the accompanying drawings, of which:

FIGS. 6A and 6B are block diagrams of components of an IP-based speaker in accordance with an illustrative embodiment;

Throughout the drawing figures, like reference numbers will be understood to refer to like elements, features and structures.

DETAILED DESCRIPTION OF ILLUSTRATIVE EMBODIMENTS

Figure 1A:
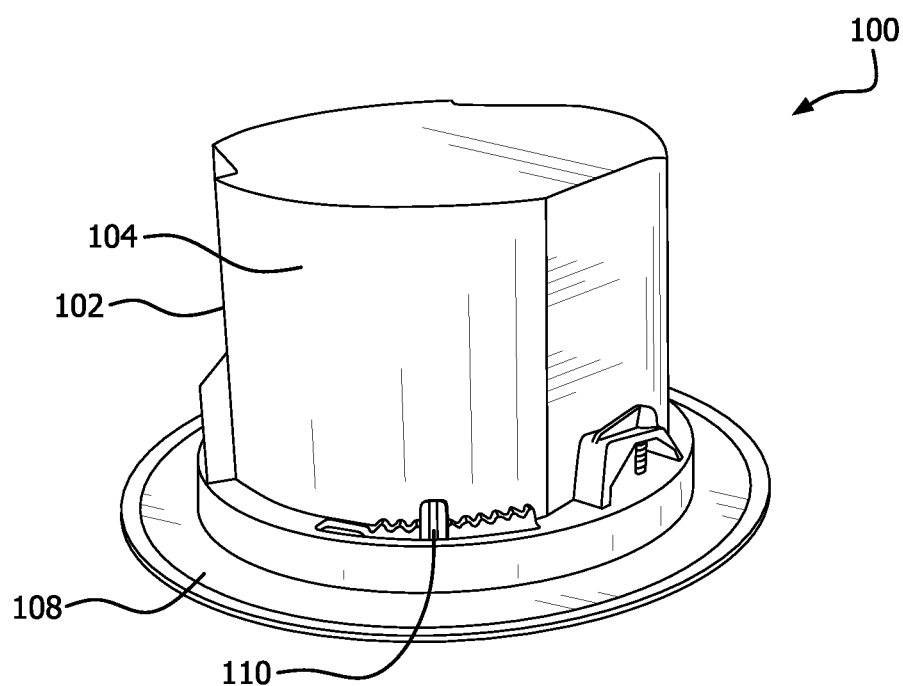
FIGS. 1A and 1B are perspective views of an example IP-based speaker in accordance with an illustrative embodiment.

Reference will now be made in detail to illustrative embodiments, which are depicted in the accompanying drawings. The embodiments described herein exemplify, but do not limit, the illustrative embodiments by referring to the drawings.

Figure 1B:
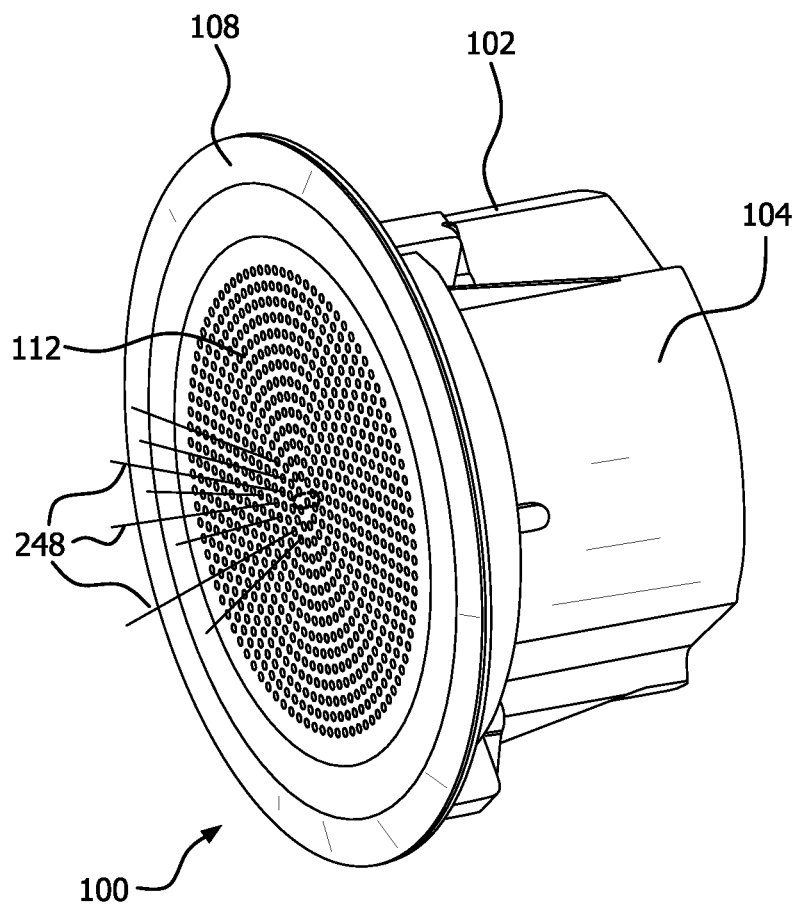
Figure 2A:
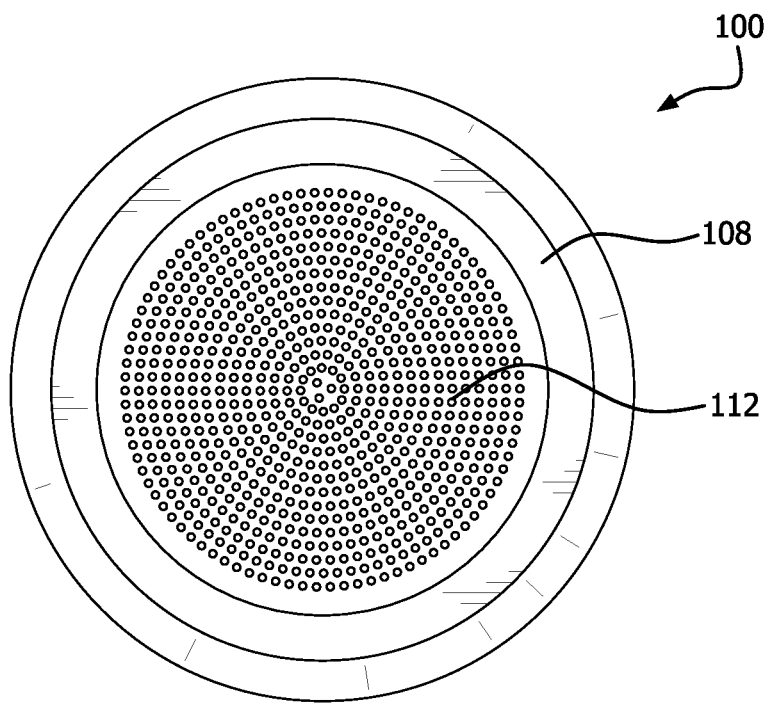
FIGS. 2A and 2B are front and side views, respectively, of the IP-based speaker in FIGS. 1A and 1B.
Figure 2B:
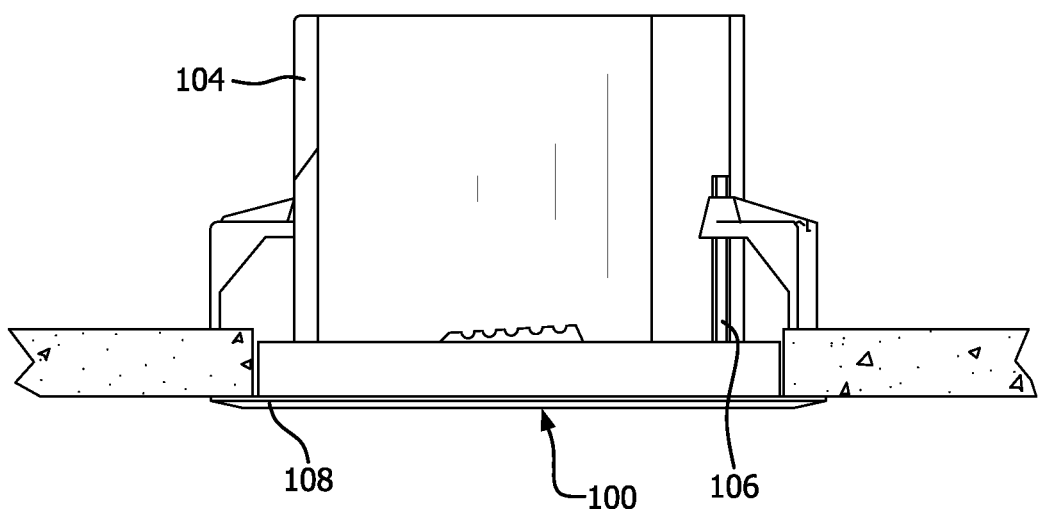

FIGS. 1A and 1B illustrate perspective views of an example IP-based speaker 100 configured in accordance with an illustrative embodiment, and FIGS. 2A and 2B are front and side views, respectively, of the speaker 100 in FIGS. 1A and 1B. The speaker 100 comprises a housing 102 which can be made of molded plastic or other material that encloses speaker assembly components such as those illustrated in FIGS. 6A and 6B as described below in accordance with illustrative embodiments. The speaker housing 102 can be constructed similarly to the housing of a B-650(T) speaker, for example, which is commercially available from DNH A/S, Kragero, Norway. The speaker housing 102 is configured for mounting into a recess in ceiling or wall surface, for example. The housing 10 has a main section 104 enclosing most of the speaker components and a removable cover 108. The main section 104 can be installed through an opening in the ceiling or wall surface and secured in place against the surface via one or more screws received in mounting brackets or fasteners 106. The cover 108 is removably secured to the main housing 104 via clips 110 to optionally expose the interior of the main housing when removed therefrom, and to otherwise present a grill 112 when attached to the main housing 104. It is to be understood, however, that the speaker 100 can have a housing form factor wherein the speaker is flush mounted to a ceiling or wall surface.

Figure 3B:
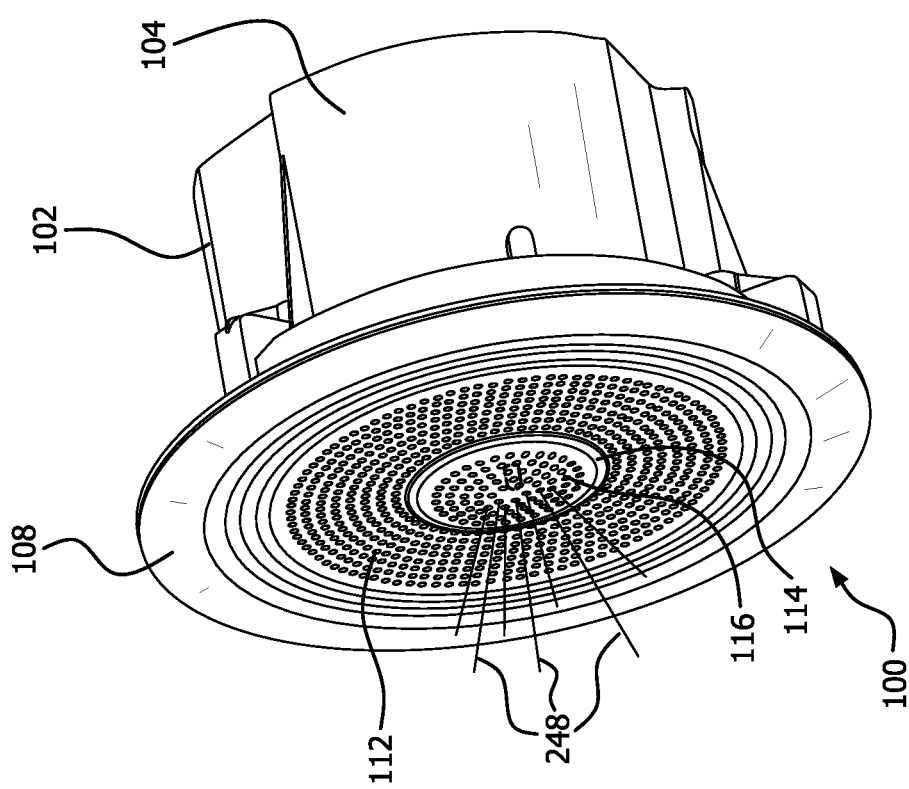
FIGS. 3A, 3B, 4 and 5 are perspective views of example IP-based speakers in accordance with another illustrative embodiment.

With reference to FIGS. 1B, 2A and 3B, at least a portion of the front surface of the speaker 100 comprises a grill 112 with plural openings that facilitate output of sound from a loudspeaker 214 (FIG. 6B) provided within the housing 102. The openings also allow a user to see light output from an alarm LED 248 provided on a speaker control board 120 (FIG. 6A) mounted within the housing 102.

With reference to FIGS. 3A, 3B, 4 and 5, and in accordance with other example embodiments, the speaker 100 can be alternatively configured to have an opening 114 that receives an optional add-on device 116 such as a camera, LED device or other device, or simply a cover for the opening 114. For example, the main section 104 of the housing 102 can have a recess therein that is sufficient to receive a least a portion of an add-on device 116. The removable cover 108 can have the opening 114, which is dimensioned to receive the add-on device 116. For example, the opening 114 can be 2" inches in diameter and or other diameter that is smaller than the diameter of the cover 108.

The add-on device 116 has a pluggable electrical interface between the add-on device 116 and the control board 120 in the speaker main housing section 104. For example, the add-on device 116 can have a flexible cable or ribbon cable electrically connected thereto at one end thereof that has an electrical plug or connector provided at the other end thereof for electrical connection to the control board 120. The flexible cable or ribbon cable is configured to be disposed within the recess of the main section 104 of the housing 102 following assembly with the add-on device 116, and to have sufficient length to allow the add-on device 116 to be rotated relative to the control board 120 without disconnecting the electrical plug or connector from the control board 120. The electrical plug or connector of the add-on device 116 is electrically connected to a cooperating connector associated with the control board 120 to provide electrical power from the control board 120 to the add-on device 116's components, and to allow exchange of inputs, outputs and/or control signals between the speaker control board 120 and the add-on device 116. For example, the add-on device 116 can have a pressure fit connector that electrically connects to a plug on the board 120 when the add-on device 116 is installed in the speaker, and that is released from the plug upon application of a sufficient force that separates the add-on device 116 from the speaker 100. The opening 114 and the add-on device 116 can be provided with cooperating mounting features that allow detachment of the add-on device 116 from the opening 114. For example, the opening 114 can be provided with a helical groove along an inner circumferential surface thereof that cooperates with a screw thread provided along an exterior surface of the add-on device 116. Alternatively, pressure mounted clips can be used to detachably mount an add-on device 116 within the opening 114 of the speaker 100. In an alternative embodiment, the add-on device 116 is integral or otherwise connected to control board 120 and related components in a single sub-assembly that rotates relative to the main section 104 of the housing 102.

Figure 3A:
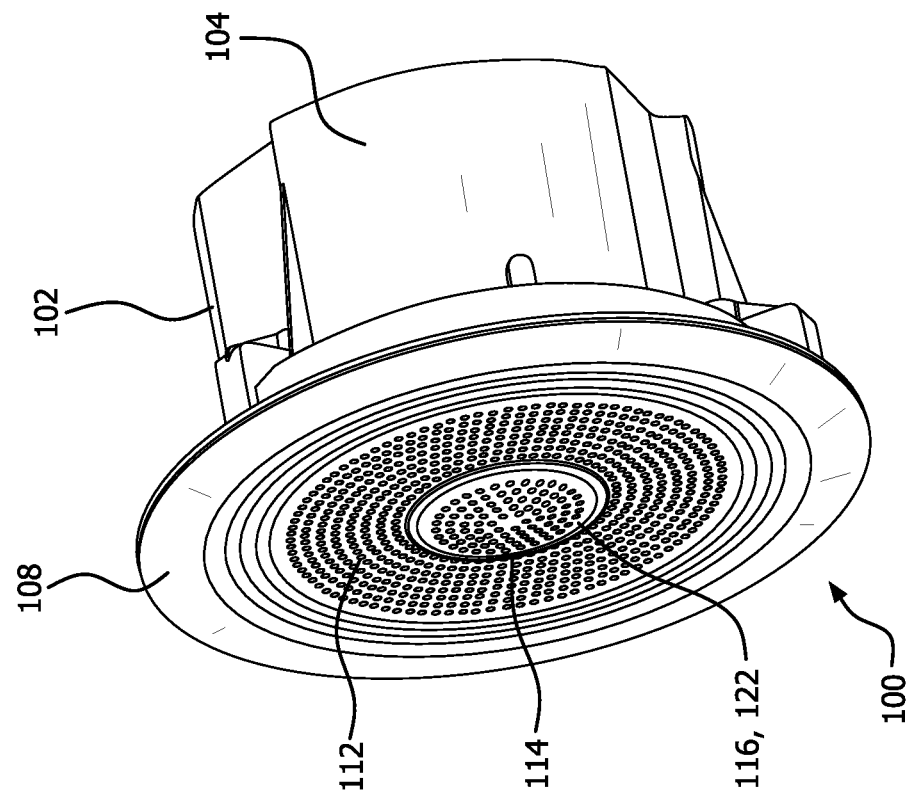

With reference to FIGS. 3A and 3B, the add-on device 114 is a cover 122 having a grill pattern similar to the grill 12. As shown in FIG. 3B, an LED is visible through the add-on device 116. For example, the LED can be part of the speaker control board 120, in which case the LED can be visible through the grill 112 in the embodiment of the speaker 100 shown in FIGS. 1B and 2A, or through the add-on device 116 shown in FIGS. 3A and 3B. It is to be understood that placement of the LED within the housing 102 is not limited to viewing from the center of the housing 102 front or opening 114 and can instead be visible from a peripheral location within the speaker housing 102. Also, the LED can be part of the speaker control board 120 or the add-on device 116 in accordance with example embodiments. In accordance with another example embodiment, the speaker 100 can be provided with an LED and the add-on device 116 can have another LED.

Figure 5:
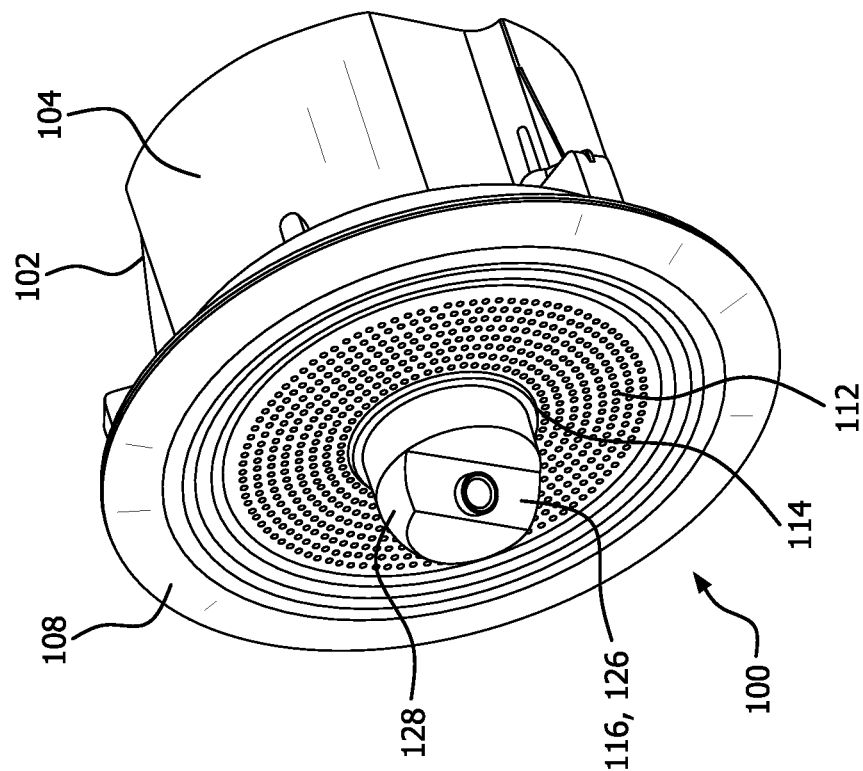
Figure 4:
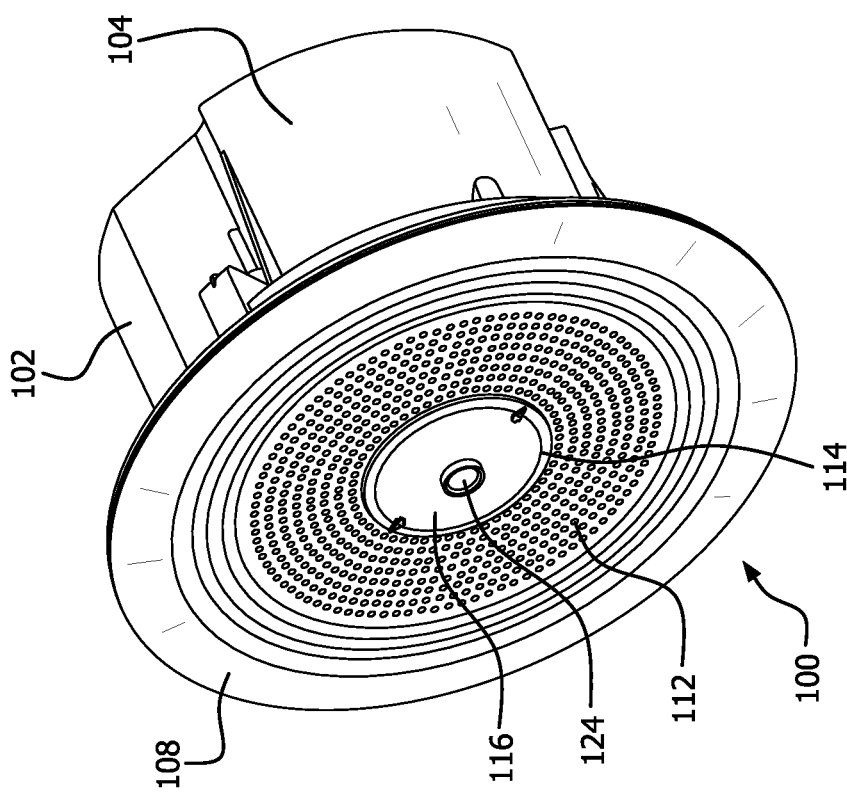

As shown in FIG. 4, the add-on device 116 comprises a flush mount camera 124 having a lens providing a field of view that is parallel with the longitudinal axis of the housing 102. In FIG. 5, the add-on device 116 has a housing structure 128 (e.g., a dome-like structure) that extends away from the cover 108 enclosing a camera 126 with a lens that provides an angled field of view with respect to the longitudinal axis of the housing 102. The housing structure 128 can be configured to rotate relative to the add-on device 116 housing or otherwise relative to the speaker 100 to allow set up of a camera to a desired field of view. The housing structure 128 can be translucent to allow a user in the vicinity of the speaker to see output from one or more LEDs or other visual indicator(s) provided in the add-on device 116 such as a fire alarm that flashes.

Figure 10:
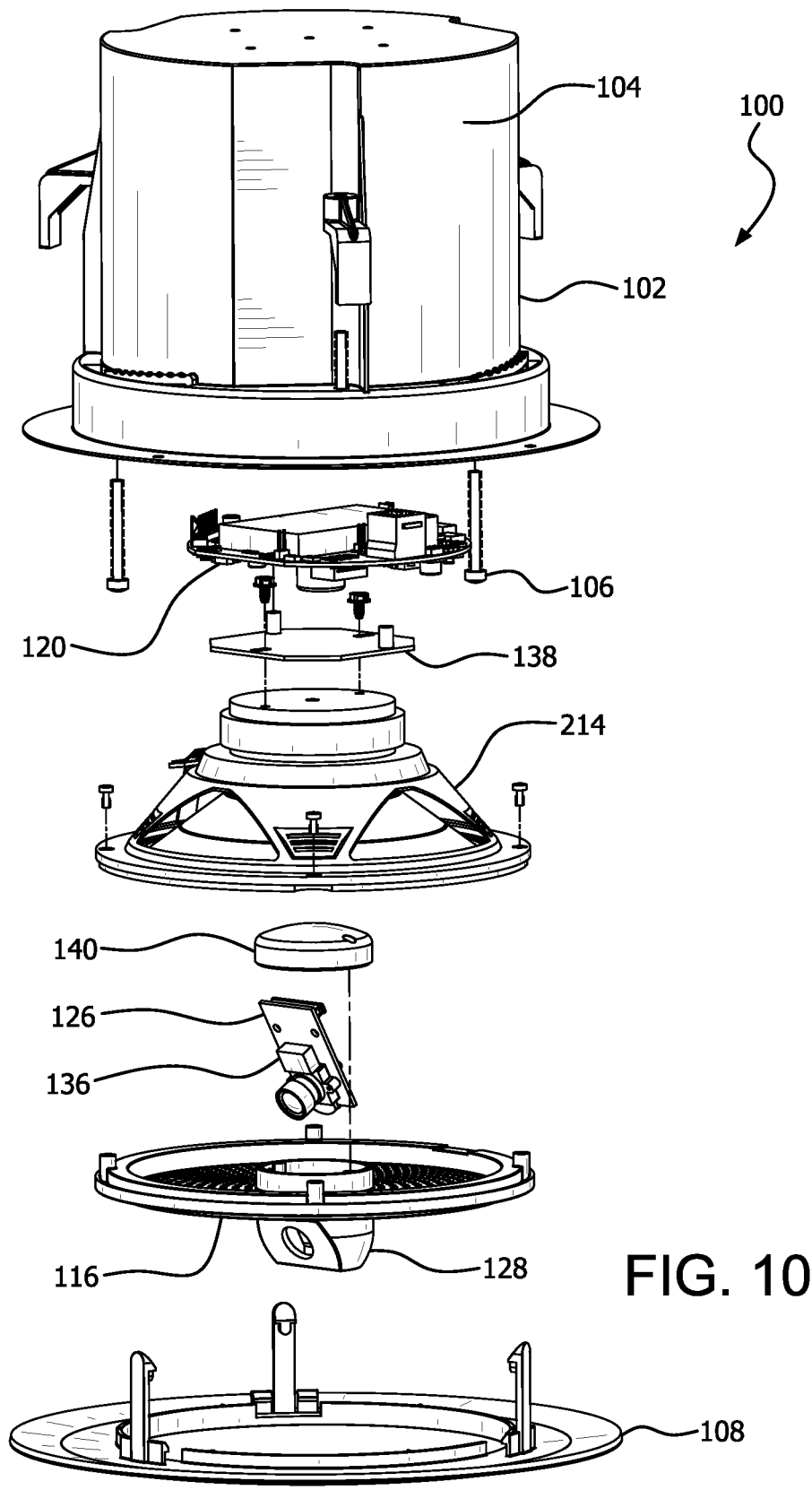
FIG. 10 is an exploded view of an example IP-based speaker with infrared (IR) camera and switchable IR filter in accordance with an illustrative embodiment.

In accordance with another example embodiment and with reference to FIG. 10, the add-on device 116 comprises an infrared (IR) camera 126 to provide day-time and night-time images (e.g., for security applications) for a selected area in the field of view of the camera. The IR camera can have a switchable electromagnetic filter to automatically switch an IR filter from being in front of the camera to pass only visible light, to being away from the camera when the camera senses image quality degradation from insufficient visible light to output IR images instead. The dome 128 can be swiveled for desired angle and field of view. For example, the automatically switchable IR filter 138 can be operated by the camera 126 to block IR and pass visible light when camera image quality is determined to meet criteria for day-time image capture operation, and to not block IR when camera image quality is determined to meet criteria for night-time image capture operation. The IR camera 126 with switchable IR filter 136 can be accommodated in a dome 128. The dome 128 is dimensioned in terms of length and diameter and look-down face angle to accommodate an IR camera, which can have a comparatively larger form factor than regular visible spectrum only camera because of the IR filter 138. The add-on device 116 with IR camera 126 can be provided with a cap 140. The cap 140 is beneficial to reduce any acoustical anomalies occurring in the cavity of the camera dome 128 on the frequency response of the speaker 214 output. The IR camera add-on 116 can have a ribbon connection or other electrical interface (not shown) with the speaker control board 120 to send images via Ethernet to IP endpoint device 130 and to optionally receive power. The IR camera 126 is indicated as installed as a pluggable add-on device 116; however, it can also be mounted integrally to the speaker 100.

As described below in connection with FIGS. 6, 7, 8 and 9, the speaker 100 provides an Ethernet connection to an amplifier and loudspeaker, and is IP addressable to operate with other IP device(s) 130 connected via Ethernet (e.g., optic cable or CAT5 cable) to provide one-way and/or two-way IP communications. For example, the IP devices 130 can be IP end units (e.g., a HUBBCOM™ IP device, or Elemec3 Networked Public Address and General Alarm System (PA/GA) controller commercially available from GAI-Tronics, Reading, Pennsylvania) and a SIP server for two-way IP communications, and an optional video switch for one-way IP communications. As described below, the Ethernet connection provides bi-directional audio between the speakers 100 and the IP devices 130 and optional unidirectional video from a speaker(s) 100 with a camera to a video switch 130. Regardless of the type of IP device 130 used, an IP device 130 and one or more speakers 100 are configured in accordance with example embodiments to allow the IP device 130 to send digitized audio to the speakers 100 for pages and public address (PA) announcements. The speakers 100 are powered via PoE/PoE+, and can be configured as addressable individually, as a zoned unit, and/or as an all-page unit with respect to an IP device 130.

Figure 7:
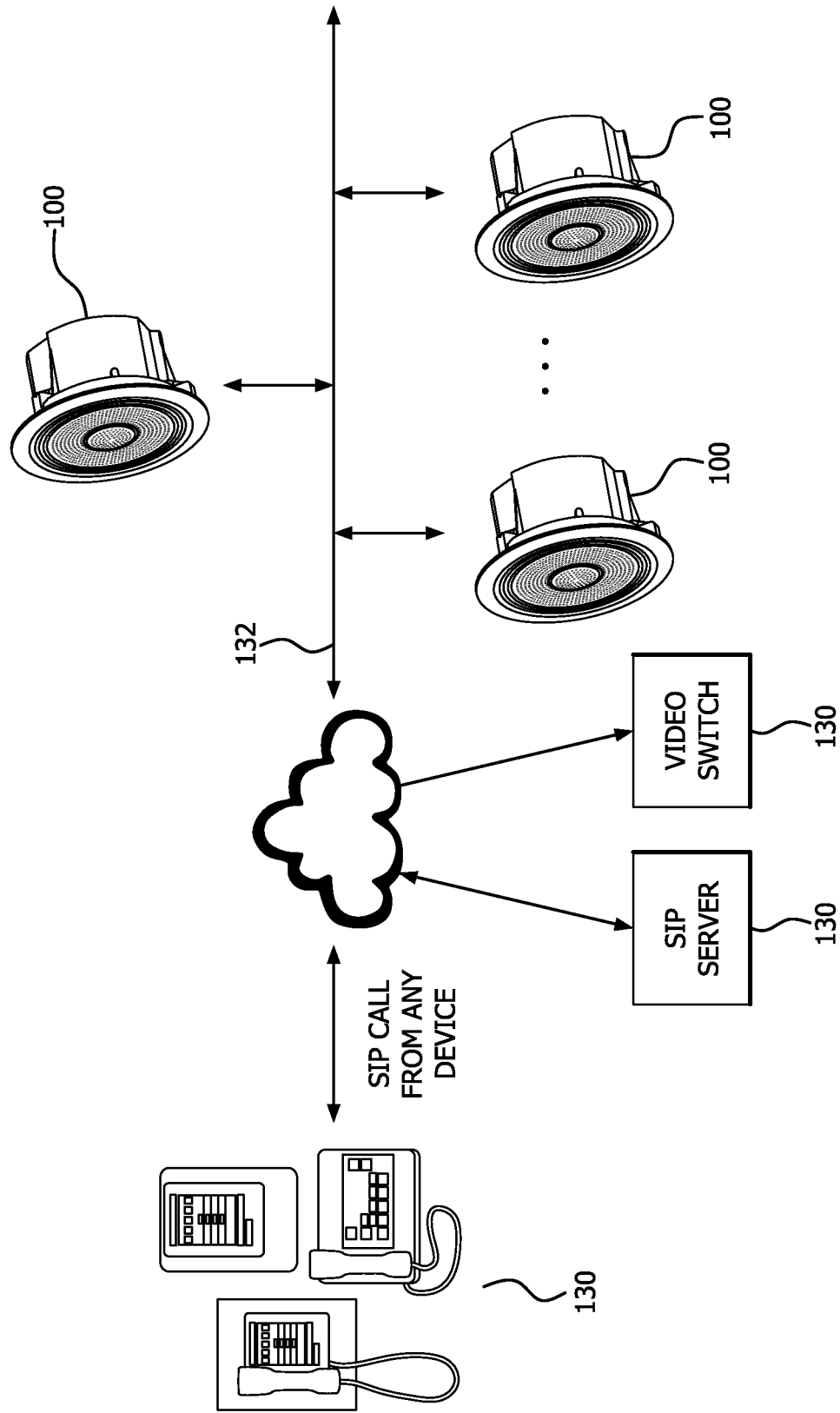
FIG. 7 is a diagram of IP-based speakers connected to an IP device in accordance with an illustrative embodiment.
Figure 8:
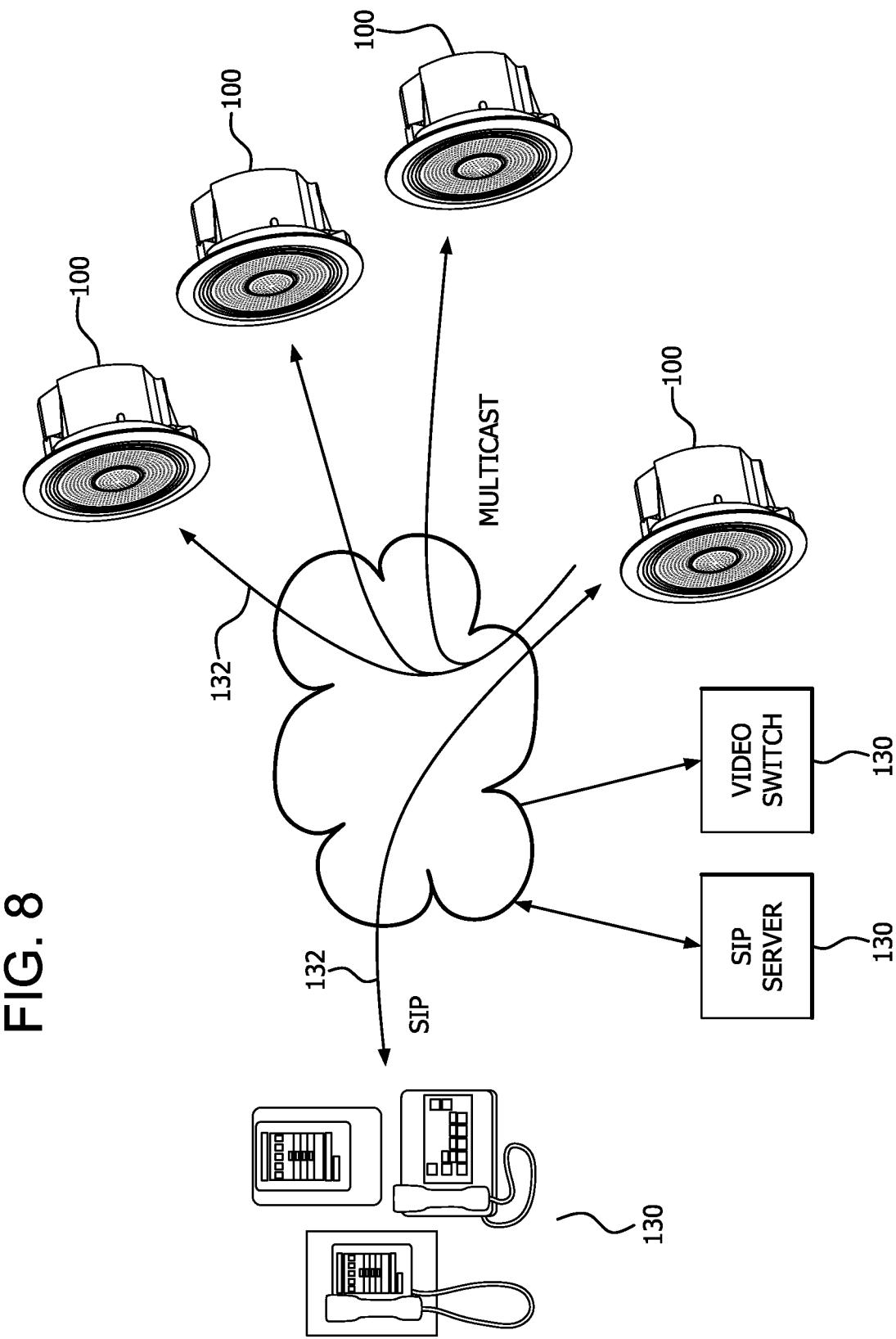
FIG. 8 is a diagram of IP-based speakers connected to an IP device and providing rebroadcasts in accordance with an illustrative embodiment.

FIG. 7 depicts an example multi-Function IP endpoint device 130 available from GAI-Tronics and SIP server 130 that can be programmed to send pages, alarms, other announcements to speakers 100 that are connected via multicast technology, as well as to receive audio via a talkback function of the speaker(s) 100. In addition, when used in connection with a video surveillance system, speakers 100 can provide video to an optional video switch 130, Speakers 100 are provided with IP addresses and IP device (s) 130 can address pages/announcements to zones of speakers. For example, speakers 100 can be configured to be addressed in different zones whereby different speaker 100 identifiers are associated with one or more zone identifiers assigned to respective zones in an area or building where the speakers 100 are deployed. In addition, each speaker 100 can be configured to rebroadcast audio output to other IP devices using the multicast technology as depicted in FIG. 8.

Figure 9:
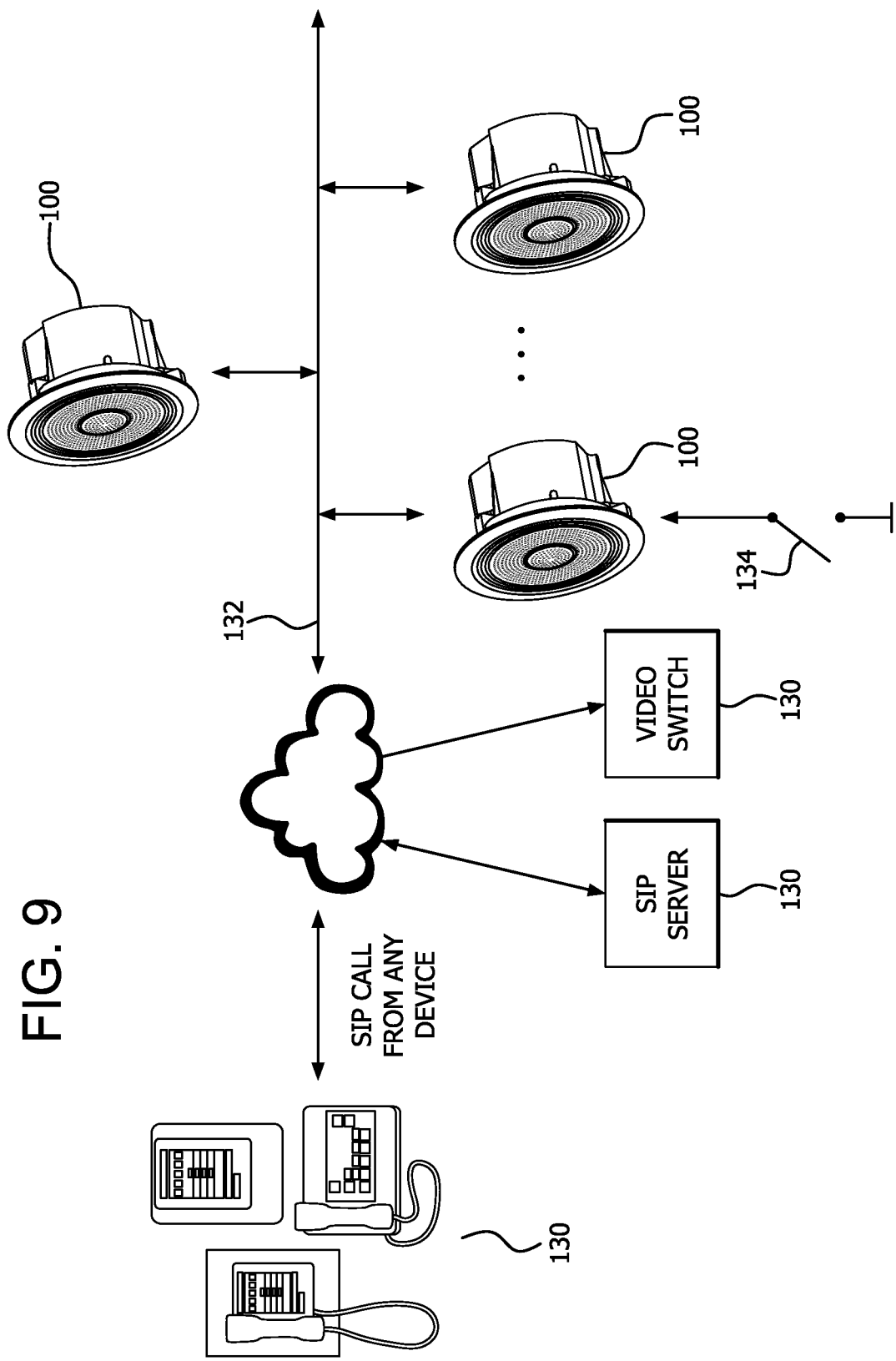
FIG. 9 is a diagram of IP-based speakers connected to an IP device and to a remote call button device in accordance with an illustrative embodiment.

With reference to FIG. 9, a speaker 100 can be configured to operate with a talkback switch or similar device 134 in the vicinity of the speaker 100 which allows an IP device 130 to sense speaker engagements. The loudspeaker 214 (FIG. 6B) in the speaker 100 can operate as a microphone and user input audio to the speaker 100 is digitized and provided to the IP device 130 via IP communications. The input audio to the loudspeaker can also be ambient environment sound relative to the speaker 100 and therefore allowed ambient level sensing or monitoring by the IP device 130 (e.g., to control speaker output level based on detected ambient noise).

Since the speaker 100 has a high bandwidth data pipe similar to other IP devices such as HUBBCOM' IP devices, the speaker 100 can be provided with an add-on device 116 that comprises a camera for surveillance, in addition to the services provided by the speaker 100 such as public address and general alarms (PA/GA) and emergency announcements. With continued reference to FIGS. 7, 8 and 9, a speaker can be provided with an optional add-on device 116 with a camera to allow camera output to be sent to the IP device so that an IP device 130 user can see and/or verbally communicate with a person in the vicinity of the speaker 100 in real-time.

With continued reference to FIG. 9, the speaker 100 can be connected to a remote device 134 such as a call button or panel to provide building entry and gate or door control. For example, the remote device 134 can be a button such as a SPST switch contact. When the device 134 is activated, the speaker can initiate its talkback function and operate the loudspeaker as a microphone and digitize and send inputted audio to the IP device(s) 130. Alternatively, an IP device 130 can send a control signal to the speaker 100 to operate the loudspeaker as a microphone (e.g., in response to a page).

As stated above, different types of IP devices 130 can be used. For example, the afore-mentioned HUBBCOM™ IP devices are configured to provide one or more of web application control, VoIP SIP telephone operation, overhead speaker broadcasts, and point-to-point serverless IP communication (audio and/or video). HUBBCOM™ IP devices can also provide an audio output for powering an external speaker 100 for overhead paging and broadcasting, access control for door or gate, emergency audible and visual alerts (e.g., public address and general announcements (PA/GA)).

The speakers 100 and the IP device(s) 130 have IP connectivity for convenient integration into an existing network through standard Ethernet cables 132. For example, an IP device 130 can be connected to one or several speakers 100 via an Ethernet link 132 (e.g., cables) and then registered, for example, with a SIP server or IP-PBX. Alternatively, the speakers 100 can include control logic that allows serverless provisioning as described in commonly owned U.S. patent Ser. No. 10/051,129, the contents of which are hereby incorporated herein by reference. IP connectivity of the speaker(s) 100 with an IP device 130 is advantageous because multicast technology can be employed to enable multiple speakers 100 to listen on a given broadcast address to receive data over an Ethernet network from a single source such as an IP device 130.

Components on the control board 120 of the speaker 100 will now be described with reference to FIGS. 6A and 6B. The control board 120 has an Ethernet connector 200 for connection to an Ethernet link (e.g., Ethernet cable) 132 between the speaker and an IP device 130 and an Ethernet interface 206. A processing device 202 and associated memory device(s) 204 are provided on the control board 120. The control board also has an audio codec 208 that provides audio output to a loudspeaker 214 (e.g., 8-Ohm) via a current-controlled limiter circuit 210 and speaker amplifier (e.g., 15-Watt) 212. A talkback amplifier 216 is provided to allow input audio via the loudspeaker cone. The processing device 202 is provided with control logic and configuration data for IP addressing and registration of the speaker 100 for communication with other IP devices, for control of the IP-based indicator(s) (e.g., LEDs) and optional camera(s) 218, and processing of input and output of audio with respect to other IP devices 130 and remote devices 134.

As stated above, the speaker 100 employs PoE/PoE+ power only; that is, no auxiliary power source is needed. PoE can be up to 6 watts, and variable via a configuration setting. PoE+ can be up to 15 watts, and variable via a configuration setting. The speaker 100 utilizes a speaker amplifier 212 rated for at least 15 watts into 8 ohms, and a current-controlled limiter circuit 210 to limit power to the speaker amplifier 212 as needed to support stable operation in PoE and PoE+ modes. The control board has PoE transformers 222, a PoE power supply 224 and current sense resistor 226 to provide +3.3V and 5 VA via regulators 228 and 230. The processor has a power management section 232 that receives 3.3V from the regulator 228. The current-controlled limiter circuit 210 receives inputs CS+ and CS− from the current-sense resistor 210 and a POE/POE+ input from the PoE power supply 224.

The control board 120 has a camera indicated at the camera board interface 218. As described herein, a speaker can have an add-on device 116 with a camera 218 mounted in the center of the grill. The camera 218 can be rotatable relative to the add-on device 126 and/or housing 112 to orient camera coverage. For example, the add-on device 126 (FIG. 5) can be used instead of add-on device 124 (FIG. 4) when a user wishes to angle the camera lens toward the radius (e.g., outward) instead of straight down. The add-on device 116 can also be provided with a night vision-type camera. The current sense resistor 226 at the output of the PoE power supply 224 can provide +24V to a regulator 234 to provide +12 VDC to an optional IR illuminator in the event the speaker 100 is provided with a night vision-appropriate camera. For example, an optional infrared (IR) LED and driver circuit can be provided to the speaker 100 via an add-on device 116 with the night vision-appropriate camera.

As stated above, the add-on device 122 can also be a cover or blank insert. As such, the speaker 100 is configured to accommodate a removable/replaceable camera and different camera types such as cameras with different camera lens types (e.g., wide-angle, fisheye, etc.). Speaker 100 is therefore versatile which is advantageous in installations wherein different types of add-on devices 116 are needed to provide different capabilities depending on speaker location and desired functions.

As stated above, the control board 120 has a talkback amplifier 216 to allow a half duplex talkback capability using the speaker cone of the loudspeaker 214. When the speaker 100 is not outputting audio, input audio is enabled for talkback function for a configurable time after no audio output activity. During a talkback mode, the loudspeaker 214 connections are fed back to a microphone input of the processing device 120's audio codec 208 such that the loudspeaker 214 is being used as a microphone during talkback mode. In addition, the processing device 120 allows the speaker 100 to be configured for remotely activated talkback using a remote device 134 (e.g., an external dry contact input 134 in FIG. 6A) connected to the speaker as illustrated in FIG. 9.

Figure 6B:
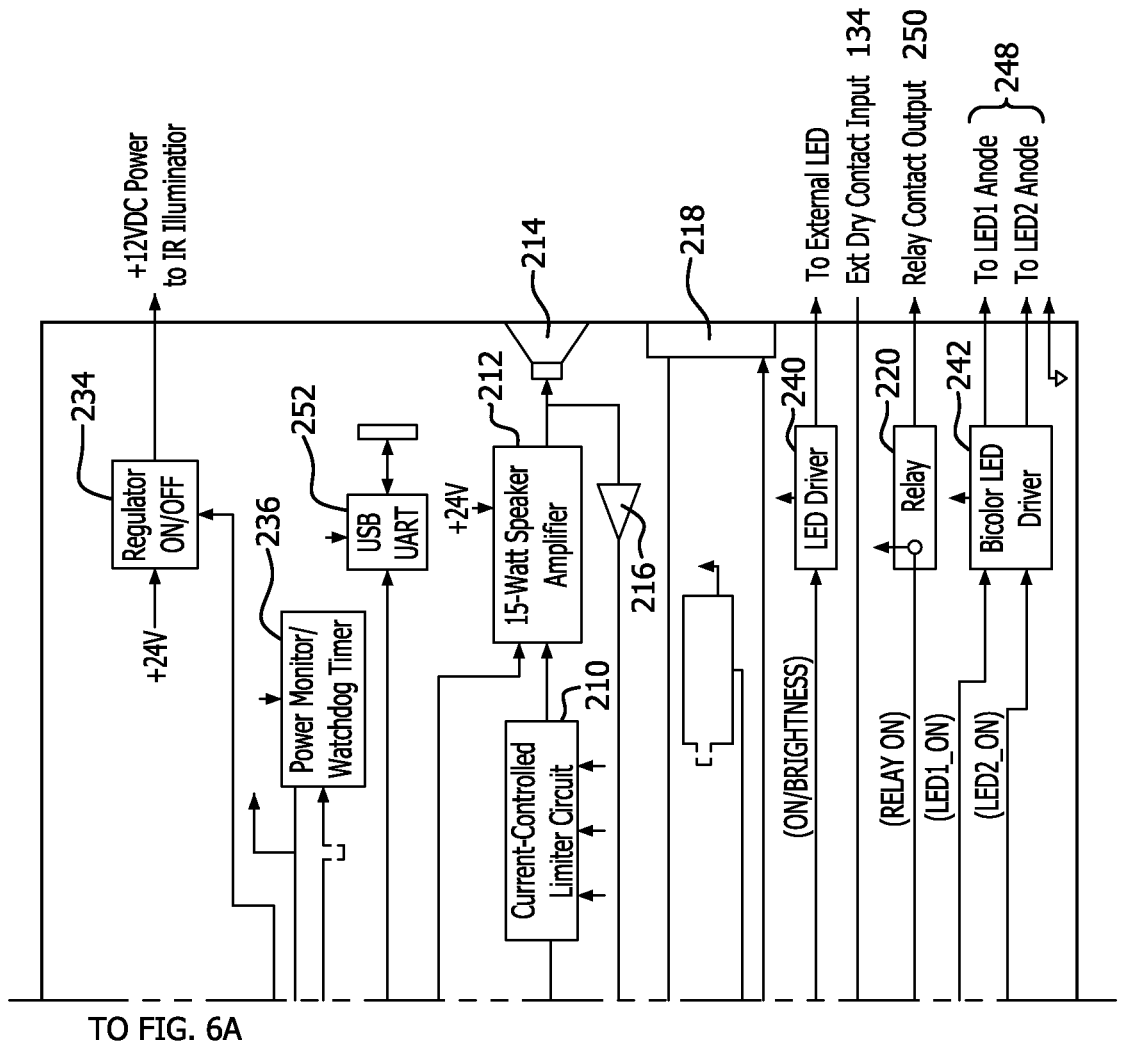

With continued reference to FIGS. 6A and 6B, the control board 120 in the main housing 104 of the speaker 100 has an LED driver (200 mA) 240 to drive an external LED indicator for such things as indicating status of the speaker 100 (e.g., active, powered) or to illuminate the area in its vicinity for egress of people. The processing device 202 can be provided with logic for local control (e.g., versus IP device 130 control) for activity indication, or remote control for alarms, etc. The LED driver 240 can act as a current source with a maximum current rating of 200 mA. The output current can be reduced from the 200 mA value using a PWM signal from the processing device 202. A heartbeat LED 244 and Ethernet LED(s) 246 can be driven by the processing device 202 to indicate that the speaker 100 has power and Ethernet connectivity. A bicolor LED driver 242 is provided to drive a common-cathode bicolor LED such as a red/green LED (e.g., whereby a third color (e.g., amber) can be produced if both LEDs are driven simultaneously) to provide an IP-based alarm LED 248 operated in accordance with control signals from an IP device 130, for example, to flash or illuminate a selected color to indicate a designated event to personnel within the vicinity of the speaker 100. As stated above, the speaker 100 can be provided with an add-on device 116 with night-vision appropriate camera, and therefore a possible need to drive an IR LED to allow night-vision with the appropriate camera. The regulator 234 can provide a +12 VDC voltage source to power an external IR illuminator. The +12 VDC voltage source can be switched on and off by the processing device 202 such as switched on at night and switched off during daytime.

The control board 120 has contact input to allow for talkback initiation from an external button (e.g., a call button switch or other device 134) operated by a user to activate the talkback function. For example, the processing device 202 can be provided with an external dry contact input 134. A relay 220 (e.g., small relay less than or equal to 2 A DC) and contact output 250 allow activation of an external DC-powered device (e.g., to activate an E3 alarm). The processing device 202 can be provided with logic for local control (e.g., versus IP device 130 control) for activity indication (e.g., operate the alarm LED 248), or remote control for alarms, etc. The control board 120 can also have a processor module-controlled Form A (SPST) relay contact with a 30 VDC/2 A contact rating.

Ambient level sensing (ALS) and supervision via ambient noise as described above can be reported to E3 and/or SNMP systems. For example, output of the speaker is adjusted higher or lower to maintain a set level of output above sensed ambient level. A factory reset pushbutton 238 and MicroSD card connector 254 are also provided (e.g., for initial programming of the speaker 100).

The IP-based speaker 100 described herein in accordance with various example embodiments realizes a number of advantages. The IP-based speaker 100 takes advantage of the high bandwidth data pipe afforded the speaker 100 by virtue of its Ethernet connection to an IP device 130. The IP device 130 generally has a more powerful and higher quality and high cost amplifier for audio data sent to one or more IP-based speakers connected to it, allowing for a more cost effective amplifier to be used in each of the IP-based speakers and effectively lowering the unit cost of each IP-based speaker without degrading their sound quality. In addition, the high bandwidth data pipe allows for more data features and services to be provided by the IP-based speakers such as the use of different types of cameras and/or talkback features and/or remote relay control of doors or gates for security applications as well as public address applications.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A speaker comprising:
a loudspeaker connected to a speaker amplifier;
a codec configured to provide audio to the speaker amplifier;
an Ethernet interface to an Ethernet link;
a camera;
a processing device connected to the Ethernet interface and the codec and the camera, and configured to associate the speaker with an Internet Protocol (IP) address;
a main housing having walls that enclose the loudspeaker, the codec, the Ethernet interface and the processing device except for a front side thereof; and
a detachable cover that covers the front side of the main housing when detachably affixed thereto;
wherein the processing device is further configured to receive packets with the IP address from an IP device connected to the speaker via the Ethernet link and to transmit packets to the IP device via the Ethernet link, and output digitized audio in received packets via the loudspeaker, and to provide images from the camera to the IP device via transmitted packets.

2. The speaker of claim 1, wherein the IP device is chosen from a session initiation protocol (SIP) server, an IP endpoint device, and a video surveillance device, and an IP endpoint device is chosen from a Voice over IP (VoIP) phone and a Public Address and General Alarm System (PA/GA) controller.

3. The speaker of claim 1, wherein the main housing has a recess therein to receive an add-on device, and the cover has an opening through which the add-on device is inserted, the add-on device being detachably affixed to at least one of the main housing and the cover.

4. The speaker of claim 3, wherein the camera is provided in the add-on device and is electrically connected to the processing device when the add-on device is affixed to at least one of the main housing and the cover.

5. The speaker of claim 4, wherein the camera comprises a lens that is flush mounted with respect to the cover and provides a field of view parallel with respect to a longitudinal axis of the speaker.

6. The speaker of claim 4, wherein the add-on device comprises a housing structure that extends away from the cover when the add-on device is affixed to the speaker, and a lens of the camera is provided in the housing structure and directed to provide an angled field of view with respect to a longitudinal axis of the speaker.

7. The speaker of claim 1, wherein the cover has a grill comprising a pattern of apertures, and the add-on device comprises a second cover configured to cover the opening.

8. The speaker of claim 7, wherein the second cover has a second grill comprising the pattern of apertures.

9. The speaker of claim 1, wherein the speaker comprises at least one transformer and a power supply configured to supply power the speaker from the Ethernet link using at least one of using Power over the Ethernet (PoE) and PoE+.

10. The speaker of claim 1, further comprising at least one indicator that is visible to a user when the speaker is mounted to a surface, and is chosen from a light emitting diode (LED) and a bicolor LED.

11. The speaker of claim 10, wherein the processing device is configured to control the at least one indicator to indicate a connection status chosen from when the speaker is connected to the Ethernet link, and when speaker is not connected to the Ethernet link.

12. The speaker of claim 1, wherein the loudspeaker comprises a speaker cone configured to receive audio when not outputting audio, and the speaker is configured to operate in talkback mode wherein audio can be inputted via the speaker cone and the processing device is configured to control digitization and transmission of the inputted audio to the IP device.

13. The speaker of claim 12, further comprising a talkback switch input to the processing device, the processing device being configured to initiate the talkback mode in response to receiving the talkback switch input upon activation of a talkback switch.

14. The speaker of claim 1, further comprising a relay configured to operate a device connected to the relay in response to a relay control output generated by the processing device.

15. The speaker of claim 1, further comprising a memory device configured to store audio files, the processing device configured to output at least one of the stored audio files via the loudspeaker in response to instructions received from the IP device identifying the at least one of the stored audio files for playback.

16. The speaker of claim 1, wherein the camera is night vision-type camera, and further comprising an infrared light emitting diode (LED) to provide illumination for the night vision-type camera.

17. The speaker of claim 1, wherein the camera comprises an infrared (IR) camera and an automatically switchable IR filter to block IR and pass visible light when camera image quality is determined to meet criteria for day-time image capture operation, and to not block IR when camera image quality is determined to meet criteria for night-time image capture operation.

18. A speaker comprising:
a loudspeaker connected to a speaker amplifier;
a codec configured to provide audio to the speaker amplifier;
an Ethernet interface to an Ethernet link;
at least one indicator visible to a user when the speaker is mounted to a surface;
a processing device connected to the Ethernet interface and the codec and the indicator, and configured to associate the speaker with an Internet Protocol (IP) address; and
a main housing having walls that enclose the loudspeaker, the codec, the Ethernet interface, the at least one indicator, and the processing device except for a front side thereof;
wherein at least a portion of the front side of the speaker comprises a grill with plural openings that facilitate output of sound from the loudspeaker;
wherein an output generated by the at least one indicator is visible through the grill and outside of the main housing;
wherein the processing device is further configured to receive packets with the IP address from an IP device connected to the speaker via the Ethernet link, and output digitized audio in the received packets via the loudspeaker, and operate the at least one indicator to generate the output to indicate a selected condition in accordance with indicator instructions in the received packets.

19. The speaker of claim 18, wherein the IP device is chosen from a session initiation protocol (SIP) server, an IP endpoint device, and a video surveillance device, and an IP endpoint device is chosen from a Voice over IP (VoIP) phone and a Public Address and General Alarm System (PA/GA) controller.

20. The speaker of claim 18, wherein the speaker comprises at least one transformer and a power supply configured to supply power the speaker from the Ethernet link using at least one of using Power over the Ethernet (PoE) and PoE+.

21. The speaker of claim 17, wherein the at least one indicator is chosen from a light emitting diode (LED) and a bicolor LED.

22. The speaker of claim 18, wherein the processing device is configured to control the at least one indicator to indicate a connection status chosen from when the speaker is connected to the Ethernet link, and when speaker is not connected to the Ethernet link.

23. The speaker of claim 18, wherein the loudspeaker comprises a speaker cone configured to receive audio when not outputting audio, and the speaker is configured to operate in talkback mode wherein audio can be inputted via the speaker cone and the processing device is configured to control digitization and transmission of the inputted audio to the IP device.

24. The speaker of claim 23, further comprising a talkback switch input to the processing device, the processing device being configured to initiate the talkback mode in response to receiving the talkback switch input upon activation of a talkback switch.

25. The speaker of claim 18, further comprising a camera, and a relay configured to operate a device connected to the relay in response to a relay control output generated by the processing device.

26. The speaker of claim 18, further comprising a memory device configured to store audio files, the processing device configured to output at least one of the stored audio files via the loudspeaker in response to instructions received from the IP device identifying the at least one of the stored audio files for playback.

* * * * *